(12) United States Patent
Brinker et al.

(10) Patent No.: US 9,333,469 B2
(45) Date of Patent: May 10, 2016

(54) MULTI-MOTION ASSEMBLY FOR LEADSCREW SYSTEM

(75) Inventors: Jeffrey Brinker, Westfield, NJ (US); Michael Cai, Old Bridge, NJ (US); William G. Van Ocker, Perkasie, PA (US)

(73) Assignee: Distek, Inc., North Brunswick, NJ (US)

( * ) Notice: Subject to any disclaimer, the term of this patent is extended or adjusted under 35 U.S.C. 154(b) by 191 days.

(21) Appl. No.: 13/043,983

(22) Filed: Mar. 9, 2011

(65) Prior Publication Data
US 2012/0227528 A1 Sep. 13, 2012

(51) Int. Cl.
*F16H 25/20* (2006.01)
*B01F 7/16* (2006.01)

(52) U.S. Cl.
CPC ............ *B01F 7/161* (2013.01); *F16H 25/2025* (2013.01); *Y10T 74/19702* (2015.01)

(58) Field of Classification Search
CPC ............ F16H 25/2025; F16H 25/2015; F16H 25/205; F16H 2025/2053; F16H 2025/2096; B01F 7/16; B01F 7/161; B01F 7/1605; B01F 7/00741; B01F 7/00733
USPC .......... 74/89.37, 89.38, 89.39, 89.28, 424.75; 192/138, 139, 141; 366/286
See application file for complete search history.

(56) References Cited

U.S. PATENT DOCUMENTS

| | | | | |
|---|---|---|---|---|
| 399,100 A | * | 3/1889 | Walther | 366/286 |
| 796,890 A | * | 8/1905 | Blackett | 74/424.78 |
| 1,251,087 A | * | 12/1917 | Mosca | 74/424.78 |
| 1,283,386 A | * | 10/1918 | Wenzelmann | 192/141 |
| 1,394,315 A | * | 10/1921 | Lewis | 192/17 R |
| 1,738,898 A | * | 12/1929 | Head | 366/182.1 |
| 1,912,390 A | * | 6/1933 | Van Berkel | 74/424.78 |
| 2,417,434 A | | 3/1947 | Mead et al. | |
| 2,743,623 A | | 5/1956 | Wells | |

(Continued)

FOREIGN PATENT DOCUMENTS

DE 19641972 A1 4/1998

OTHER PUBLICATIONS

European Search Report; Mailed May 18, 2012 for corresponding EP Application No. 12158889.1.

(Continued)

*Primary Examiner* — William Kelleher
*Assistant Examiner* — Emily Cheng
(74) *Attorney, Agent, or Firm* — Mendelsohn Dunleavy, P.C.; Edward J. Meisarosh; Steve Mendelsohn

(57) ABSTRACT

In one embodiment, a stirring system has a stirring assembly, a threaded leadscrew, and a multi-motion assembly adapted to travel along the leadscrew and accompanying parallel guide rods. The multi-motion assembly (i) has a timing pulley for powering the stirring assembly via a timing belt and (ii) converts the rotation of the leadscrew into either travel along the leadscrew in an engaged state or rotation of the timing pulley in a disengaged state. The multi-motion assembly includes (i) a screw-nut having an inside thread matching the leadscrew's thread and (ii) a clutch sub-assembly. The clutch sub-assembly (i) prevents the screw nut from rotating with the leadscrew in the engaged state, such that leadscrew rotation causes linear movement of the multi-motion assembly and (ii) allows the screw nut to rotate with the leadscrew in the disengaged state, such that leadscrew rotation causes corresponding rotation of the screw nut and timing pulley.

22 Claims, 5 Drawing Sheets

(56) References Cited

U.S. PATENT DOCUMENTS

| | | | |
|---|---|---|---|
| 3,319,481 A | 5/1967 | Goodman | |
| 4,089,624 A * | 5/1978 | Nichols et al. | 417/362 |
| 4,266,437 A * | 5/1981 | Obergfell | 74/89.37 |
| 4,557,156 A * | 12/1985 | Teramachi | 74/424.86 |
| 4,598,238 A * | 7/1986 | Scarano | 318/282 |
| 4,831,297 A * | 5/1989 | Taylor et al. | 310/87 |
| 4,953,675 A * | 9/1990 | Aldrich | 192/223.3 |
| 5,111,708 A * | 5/1992 | Brusasco | 74/89.23 |
| 5,127,281 A * | 7/1992 | Yanawgisawa | 74/89.28 |
| 5,383,726 A * | 1/1995 | Lanaro | 366/172.1 |
| 5,559,413 A * | 9/1996 | Seto | 318/568.18 |
| 5,589,649 A | 12/1996 | Brinker et al. | |
| 5,634,377 A * | 6/1997 | Kimura et al. | 74/490.04 |
| 5,937,699 A * | 8/1999 | Garrec | 74/89.35 |
| 6,382,039 B1 * | 5/2002 | Choi | 74/89.35 |
| 6,386,057 B1 * | 5/2002 | Thomas et al. | 74/89.28 |
| 6,546,825 B1 | 4/2003 | Kugle | |
| 2004/0029284 A1 * | 2/2004 | Hess et al. | 436/43 |
| 2008/0190227 A1 * | 8/2008 | Myers et al. | 74/22 R |

OTHER PUBLICATIONS

"Overview of Leadscrew Assemblies," www.haydonkerk.com, Mar. 15, 2010, Retrieved from the Internet: <URL: http://www.haydonkerk.com/LinkClick.aspx?fileticket=RYv8D0WKm4U%3d&tabid=221>, (7 pages).

Examination Report: Mailed on Aug. 30, 2013 for the corresponding EP Application No. 12 158 889.1.

English Translation, received on Jan. 14, 2016, for the JPO Notification of Reasons for Refusal for JP Application No. JP2012-053536, mailed Nov. 24, 2015.

JPO Notification of Reasons for Refusal for JP Application No. JP2012-053536, mailed Nov. 24, 2015, along with a machine translation into English.

* cited by examiner

MULTI-MOTION ASSEMBLY FOR LEADSCREW SYSTEM

BACKGROUND OF THE INVENTION

1. Field of the Invention

The current invention relates to leadscrew systems, and more specifically but not exclusively, to leadscrew systems including nut assemblies.

2. Description of the Related Art

A leadscrew is a screw, or threaded rod, that may be used, in conjunction with a corresponding nut, to convert rotational motion into linear motion. In a typical leadscrew system, such as ones sold by Haydon Kerk Motion Solutions of Waterbury, Conn., a leadscrew is coupled to a motor that rotates the leadscrew. As the leadscrew rotates, the corresponding nut, which is screwed onto the leadscrew and also connected to a guide rod, moves up or down along the leadscrew shaft. The direction of the nut's linear motion depends on the leadscrew's direction of rotation and thread characteristics.

FIG. 1 shows a simplified side view of leadscrew system 100 comprising leadscrew 101, motor 102, corresponding screw nut 103, guide rod 104, collar 105, connecting strut 106, and support base 107. Motor 102 and guide rod 104 are rigidly attached to support base 107. Leadscrew 101 is (i) parallel to guide rod 104 and (ii) connected to motor 102 so as to be rotated by motor 102 relative to base 107, as indicated by rotational directions 101a and 101b. The thread of screw nut 103 complements the thread of leadscrew 101. The materials of leadscrew 101 and screw nut 103 are such as to allow them to have relatively low-friction interaction and, consequently, allow leadscrew system 100 to have relatively efficient translation of the rotational motion of leadscrew 101 into corresponding linear motion of screw nut 103. The materials and shape characteristics of rail guide 104 and collar 105 are such that collar 105 can slide along guide rod 104 with relatively low friction. Collar 105 may comprise a bearing or a guide. Connecting strut 106 rigidly connects screw nut 103 to collar 105 so that screw nut 103 does not rotate when leadscrew 101 rotates, but, instead, screw nut 103 moves linearly along leadscrew 101. This allows for relatively precise control of the linear motion and placement of screw nut 103 relative to base 107.

If leadscrew 101 rotates in direction 101a, then screw nut 103, along with strut 106 and collar 105, moves up (away from base 107), while, if leadscrew 101 rotates in opposite direction 101b, then screw nut 103, along with strut 106 and collar 105, moves down (toward base 107). Note that the materials and thread characteristics of leadscrew 101 and screw nut 103 may be such that screw nut 103, if it were not attached to strut 106 and collar 105, would both rotate around leadscrew 101 (in direction 101a) and move down (toward base 107) when motor 102 is not rotating leadscrew 101, merely from the effects of gravitational pull on screw nut 103 towards base 107.

SUMMARY OF THE INVENTION

One embodiment of the invention can be an apparatus comprising a multi-motion assembly. The multi-motion assembly comprises (i) a screw nut having an inside thread that matches an outside thread of a leadscrew and (ii) a clutch sub-assembly connected to the screw nut. The clutch sub-assembly is adapted to operate in any one of an engaged state and a disengaged state. In the engaged state, the clutch sub-assembly prevents the screw nut from rotating with the leadscrew, such that rotation of the leadscrew causes linear movement of the screw nut. In the disengaged state, the clutch sub-assembly allows the screw nut to rotate with the leadscrew, such that rotation of the leadscrew causes corresponding rotation of the screw nut.

Another embodiment of the invention can be a method for operating an apparatus comprising a multi-motion assembly. The multi-motion assembly comprises (i) a screw nut having an inside thread that matches an outside thread of a leadscrew and (ii) a clutch sub-assembly connected to the screw nut for operating in any one of an engaged state and a disengaged state. The method comprises (i) in the engaged state, using the clutch sub-assembly to prevent the screw nut from rotating with the leadscrew, such that rotation of the leadscrew causes linear movement of the screw nut, and (ii) in the disengaged state, using the clutch sub-assembly to allow the screw nut to rotate with the leadscrew, such that rotation of the leadscrew causes corresponding rotation of the screw nut.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
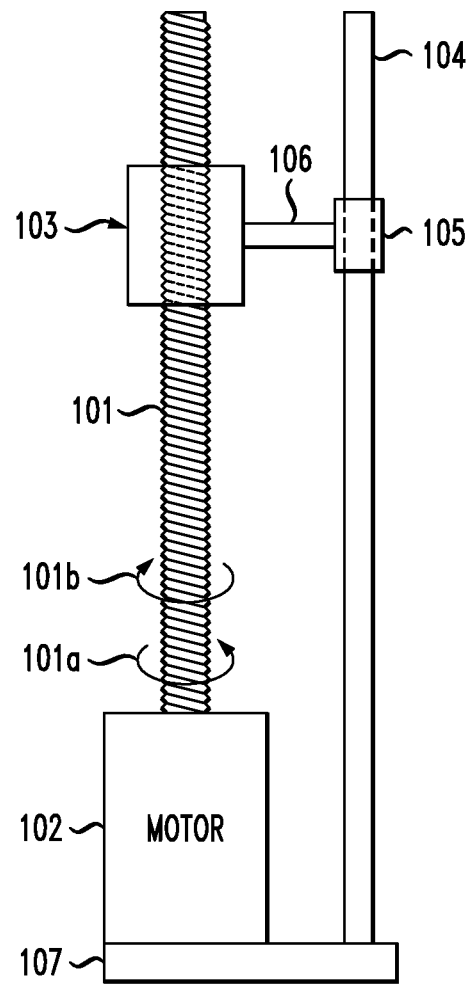
FIG. 1 shows a simplified side view of a prior-art leadscrew system.

Replacing screw nut 103 of FIG. 1 with an assembly having additional features can provide to leadscrew systems useful features that are not provided by prior-art leadscrew system 100. For example, using a multi-motion assembly can provide useful features to a leadscrew system, as described below.

Figure 2:
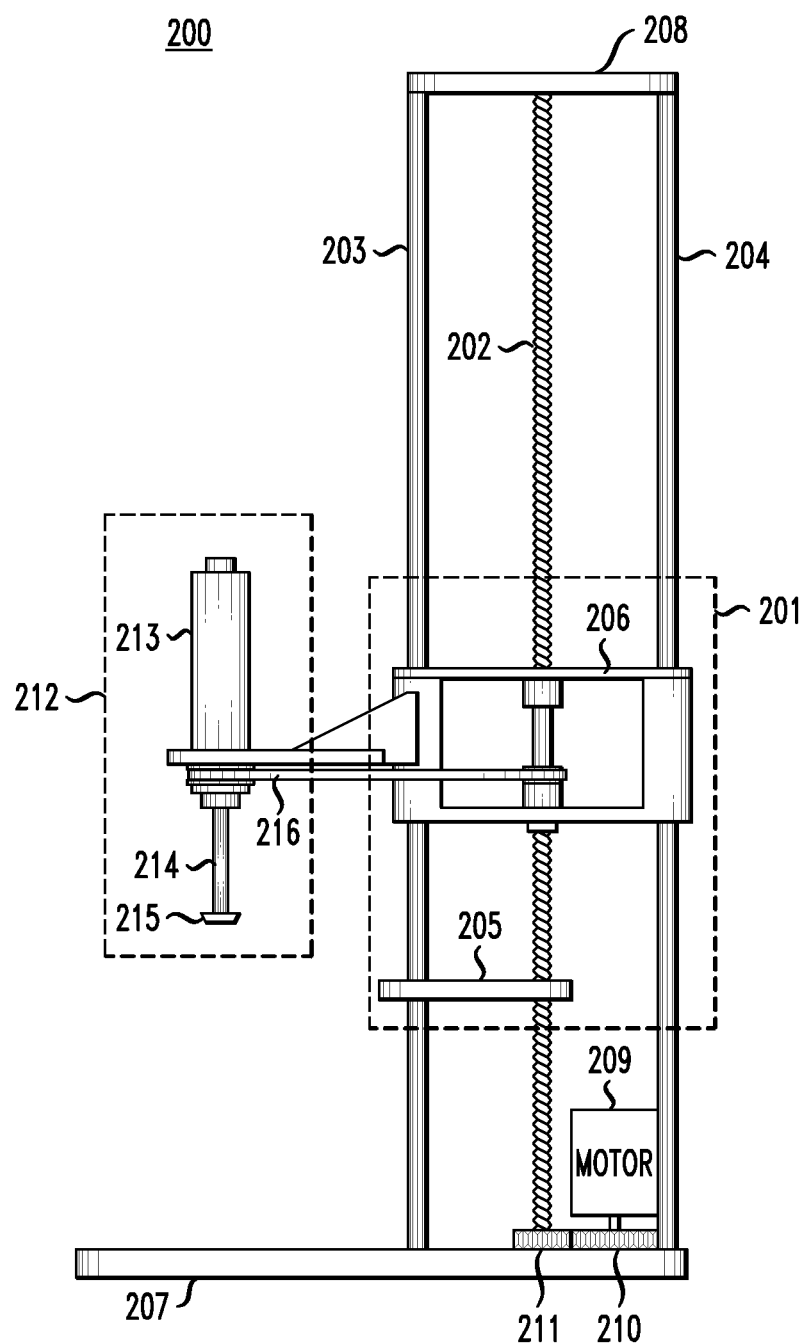
FIG. 2 shows a simplified side view of a stirring system incorporating a multi-motion leadscrew system in accordance with one embodiment of the present invention.

FIG. 2 shows a simplified side view of stirring system 200 incorporating multi-motion leadscrew system 201 in accordance with one embodiment of the present invention. Stirring system 200 may be used, for example, as part of a dissolution testing apparatus. An exemplary dissolution testing apparatus is described in U.S. Pat. No. 5,589,649, incorporated herein by reference in its entirety. As described in further detail below, stirring system 200 provides rotational power to rotate a stirrer as well as linear power to move the stirrer vertically up and down.

Stirring system 200 further comprises (i) leadscrew 202, (ii) guide rods 203 and 204, and (iii) bottom stand 207 and top plate 208, which hold and stabilize leadscrew 202 and guide rods 203 and 204. Stirring system 200 also includes motor 209, gear 210, and gear 211. Motor 209 drives gear 210, which, in turn, drives gear 211. Gear 211 is mounted on leadscrew 202 so that when motor 209 is operating, leadscrew 202 is rotated by motor 209 via gears 210 and 211. Stirring system 200 further comprises spindle-bearing assembly 212, which is supported by and connected to multi-motion assembly 206. Spindle-bearing assembly 212 includes bearing assembly 213, stirring shaft 214, and stirrer 215. Bearing assembly 213, which comprises bearings and gears (not shown), is connected to stirrer 215 via stirring shaft 214. Bearing assembly 213 is connected via timing belt 216 to a timing pulley (not individually shown) in multi-motion assembly 206 so that, when the timing pulley is rotating, stirrer 215 also rotates at a rate determined by the gear and bearing ratios of bearing assembly 213. It should be noted that timing belt 216 may have integrated teeth (not shown) to correspond to teeth on the timing pulley.

Leadscrew system 201 comprises brake plate 205 and multi-motion assembly 206. Multi-motion assembly 206 includes (i) a screw nut (not individually shown) that corresponds to leadscrew 202 and (ii) a clutch sub-assembly (not individually shown) for selectively rigidly connecting the screw nut to the collars (not individually shown) of multi-motion assembly 206 that are around guide rods 203 and 204. The clutch sub-assembly is configured to operate in any one of at least two states: an engaged state and a disengaged state.

In the engaged state, the screw nut is prevented from rotating about or with leadscrew 202 by rigid attachment to the collars around guide rods 203 and 204 via the clutch sub-assembly. Note that, as used herein, the term "rigid attachment" describes rigidity under normal operating conditions. It should be noted that rigid attachment may based on a relatively high coefficient of static friction between attached elements, where two elements described as rigidly attached might nevertheless move relative to each other without breaking if subjected to a force sufficient to overcome their mutual static friction. In the engaged state, rotation of the leadscrew causes linear motion of multi-motion assembly 206 along leadscrew 202. In the disengaged state, meanwhile, the screw nut (i) is not rigidly connected to the collars around guide rods 203 and 204 and (ii) rotates in conjunction with leadscrew 202. Thus, the clutch sub-assembly allows multi-motion leadscrew system 201 to cause the screw nut to either move linearly or rotationally, depending on the engagement state of the clutch sub-assembly.

Brake plate 205 is configured to be fixed at a particular location along leadscrew 202. When multi-motion assembly 206 is above, and not in contact with, brake plate 205, the clutch sub-assembly of multi-motion assembly 206 is in the engaged state, and the rotation of leadscrew 202 causes multi-motion assembly 206 to move up (away from bottom stand 207) or down (towards bottom stand 207), depending on the direction of rotation of leadscrew 202. If, however, leadscrew 202 rotates sufficiently to bring multi-motion assembly 206 into contact with brake plate 205 and continues rotating in the same direction to press multi-motion assembly 206 against brake plate 205, then the clutch sub-assembly will be in the disengaged state, and the continued rotation of leadscrew 202 causes, via above-described intermediary components, stirrer 215 to rotate. If leadscrew 202 subsequently reverses its direction of rotation, then the clutch sub-assembly will again enter the engaged state, stirrer 215 will stop rotating, and multi-motion assembly 206 and spindle-bearing assembly 212 will start moving upwards (away from bottom stand 207).

In other words, when the clutch sub-assembly of multi-motion assembly 206 is in the engaged state and leadscrew 202 rotates, (i) spindle-bearing assembly 212 moves up and down in tandem with multi-motion assembly 206 and (ii) stirrer 215 does not rotate. However, if multi-motion assembly 206 is brought down to brake plate 205, thereby causing the clutch sub-assembly of multi-motion assembly 206 to be in the disengaged state, and leadscrew 202 keeps rotating in the same direction, then (i) spindle-bearing assembly 212, along with multi-motion assembly 206, also stops moving down and (ii) stirrer 215 rotates as long as leadscrew 202 keeps rotating in the same direction.

Motor 209 is controlled by a controller (not shown) that may be as simple as an on/off switch. The controller for motor 209 may also be a more-complex device, such as an application-specific integrated circuit (ASIC), an appropriately programmed multi-purpose computer, or a similar device. Note that the rotational direction of leadscrew 202 may be selected by selecting the direction of rotation of motor 209, if motor 209 is capable of rotating in two directions. In one embodiment, motor 209 is a brushless direct-current (BLDC) motor. BLDC motors can rotate in either of two opposite directions. In certain embodiments, the speed of rotation of BLDC motors can be selected relatively accurately by the controller. The rotational direction of leadscrew 202 may also be selected by varying gear arrangements of the gears between motor 209 and leadscrew 202, in a manner similar to selecting forward and reverse gears in an automobile.

Figure 3:
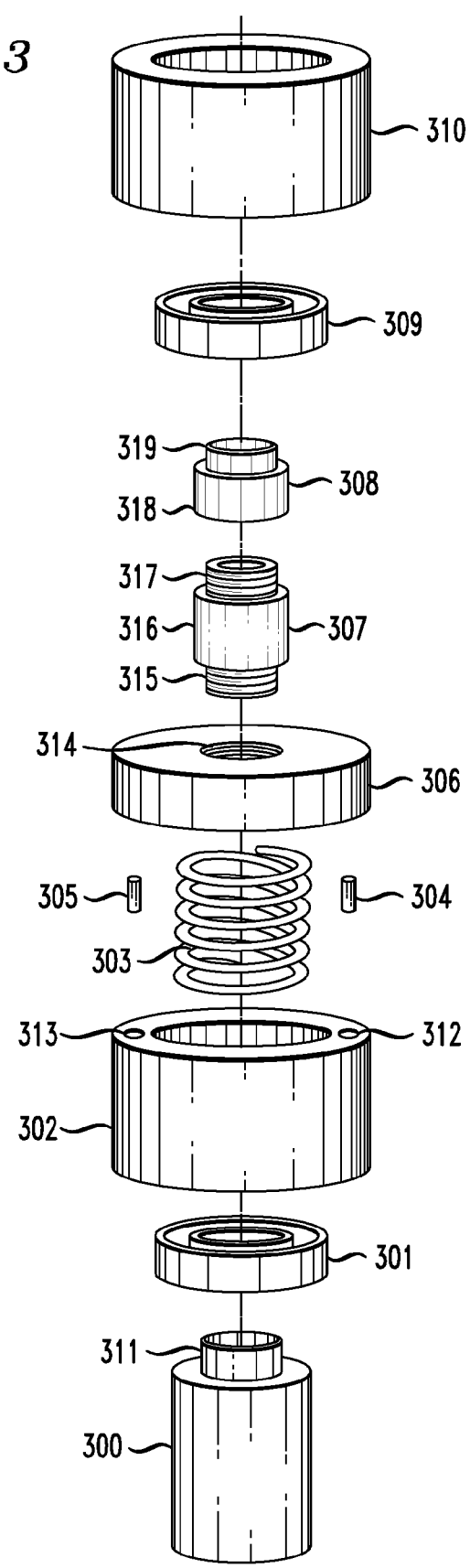
FIG. 3 shows an exploded perspective view of central components of the multi-motion assembly of FIG. 2.

FIG. 3 shows an exploded perspective view of central components of multi-motion assembly 206 of FIG. 2. Multi-motion assembly 206 comprises clutch 300, ball-bearing assemblies 301 and 309, clutch adapters 302 and 310, spring 303, pins 304 and 305, timing pulley 306, screw nut 307, and nut adapter 308. Clutch 300, ball-bearing assemblies 301 and 309, clutch adapters 302 and 310, spring 303, timing pulley 306, screw nut 307, and nut adapter 308 are substantially cylindrical components located around leadscrew 202 within the volume defined by a spindle plate that includes two collars (not shown) and a top plate (not shown). Clutch 300, ball-bearing assemblies 301 and 309, clutch adapters 302 and 310, spring 303, timing pulley 306, and nut adapter 308 are substantially collar-like, where their inside diameter is greater than the outside diameter of leadscrew 202, and, as a result, those components do not come into direct contact with leadscrew 202. Note that screw nut 307, which is threaded to complement and correspond to leadscrew 202, does come into direct contact with leadscrew 202. Also note that pins 304 and 305, discussed in greater detail below, are neither collars around leadscrew 202 nor come in direct contact with leadscrew 202.

Clutch 300 is shaped approximately as a hollow cylinder having, at top, neck 311 with a narrower outside diameter than the bottom part of clutch 300. Clutch adapter 302 has cylindrical, vertical recesses 312 and 313 in its top side for corresponding cylindrical pins 304 and 305, which are configured to be positioned within the respective recesses. Pins 304 and 305 have diameters slightly smaller than the diameters of recesses 312 and 313, consequently allowing pins 304 and 305 to move vertically up and down within recesses 312 and 313, respectively. Timing pulley 306, which is shaped approximately as a hollow cylinder having threaded internal protrusion 314 at the top, has corresponding recesses (not shown) in its bottom side for pins 304 and 305, where the diameters of the recesses are slightly larger than the diameters of pins 304 and 305, consequently allowing pins 304 and 305 to move vertically up and down within the respective recesses of timing pulley 306. Note that protrusion 314 of timing pulley 306 serves as a washer-shaped top support shelf for spring 303. Spring 303 is a compression spring.

Screw nut 307 has lower neck 315, upper neck 317, and mid-section 316. Lower neck 315 has outer threading matching the inner threading of protrusion 314 of timing pulley 306. Upper neck 317 has outer threading matching the inner threading of the lower part of nut adapter 308. Nut adapter 308 comprises lower part 318 and upper part 319. The outer diameter of lower part 318 is longer than the outer diameter of upper part 319. Lower part 318 of nut adapter 308 has inner threading (not shown) matching the outer threading of upper neck 317 of screw nut 307. Note that the inner threading of lower part 318 does not need to extend all the way to the top of lower part 318 and, in fact, lower part 318 may have different inner diameters.

Figure 4:
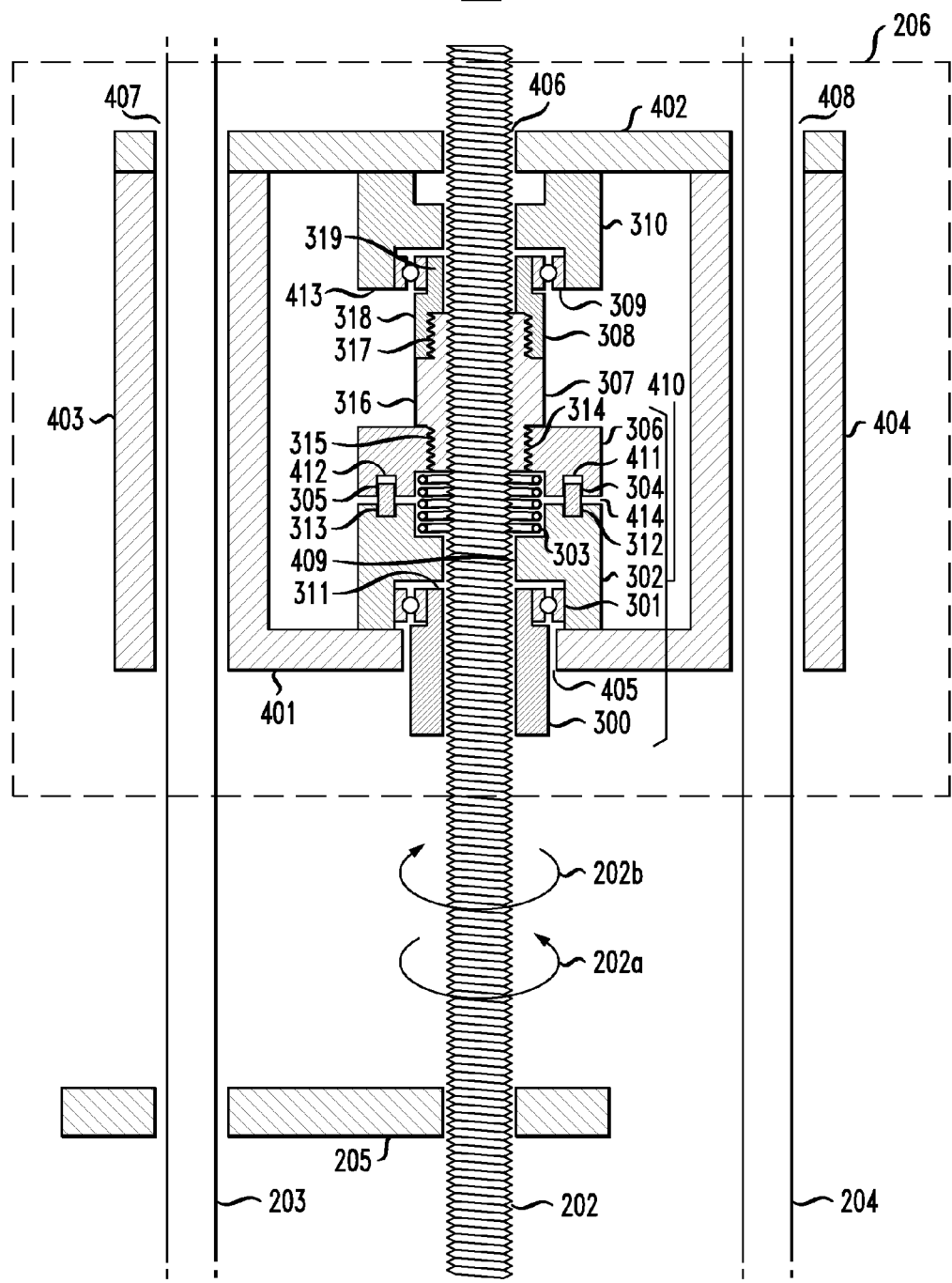
FIG. 4 shows a simplified partial cross-sectional of a multi-motion leadscrew system while in an engaged state, in accordance with one embodiment of the present invention.

FIG. 4 shows a simplified partial cross-sectional view of multi-motion leadscrew system 201 of FIG. 2 while in the engaged state, in accordance with one embodiment of the present invention. As noted above, leadscrew system 201 comprises leadscrew 202, guide rods 203 and 204, multi-motion assembly 206, and brake plate 205. Leadscrew 202 is shown in side view in order to show its threading, while the other elements of leadscrew system 201 are shown in cross-section. Multi-motion assembly 206 is framed by spindle plate 401 and top plate 402. Spindle plate 401 includes collars 403 and 404 for guide rods 203 and 204, respectively, and an opening 405 for leadscrew 202 and clutch 300. Top plate 402, which is used as a cap to hold in place the central components of multi-motion assembly 206, is rigidly attached to spindle plate 401, for example, with screws (not shown), and includes openings 406, 407, and 408 for leadscrew 202 and guide rods 203 and 204, respectively.

Multi-motion assembly 206 comprises clutch sub-assembly 410, which, in turn, comprises clutch 300, ball-bearing assembly 301, clutch adapter 302, spring 303, pins 304 and 305, and timing pulley 306. Clutch 300 is positioned within opening 405 and extends above the top and below the bottom of spindle plate 401. The outside diameter of clutch 300 is smaller than the inside diameter of opening 405 and, consequently, clutch 300 is not prevented from sliding up and down by either spindle plate 401 or leadscrew 202. Clutch 300 is, however, rigidly connected to the inner ring of ball-bearing assembly 301. In one implementation, neck 311 of clutch 300 is press fit into the cylindrical aperture within ball-bearing assembly 301. In other words, the outside diameter of neck 311 is substantially equal to the inside diameter of ball-bearing assembly 301. The rigid attachment of clutch 300 to ball-bearing assembly 301 keeps clutch 300 from falling down leadscrew 202. The outer ring of ball-bearing assembly 301 is rigidly connected to clutch adapter 302. Ball-bearing assembly 301 is a conventional ring-shaped ball-bearing assembly comprising a plurality of bearing balls rotatably connecting two concentric rings to provide low-friction rotation of the two rings relative to each other.

Clutch adapter 302 functions as a friction plate for selective engagement with spindle plate 401. Clutch adapter 302 is shaped approximately as a hollow cylinder having a ring-like internal protrusion 409 approximately in the middle, which serves as a washer-shaped bottom support shelf for spring 303. In the engaged state shown in FIG. 4, the bottom of clutch adapter 302 is pressed firmly against spindle plate 401 (due to downward force applied by compressed spring 303), thereby creating a rotation-preventing engagement due to the relatively high coefficient of friction between clutch adapter 302 and spindle plate 401.

Above clutch adapter 302 is timing pulley 306. Spring 303 rests in a recess created by protrusion 409 of clutch adapter 302 and protrusion 314 of timing pulley 306. As described above, timing pulley 306 additionally has recesses 411 and 412 in its bottom side for pins 304 and 305, respectively, which are configured to be positioned within the recesses. Pins 304 and 305 (i) allow timing pulley 306 and clutch adapter 302 to move closer together or further apart along the axis of leadscrew 202 but (ii) prevent timing pulley 306 and clutch adapter 302 from rotating independently of each other.

As such, if one of clutch adapter 302 and timing pulley 306 is prevented from rotating, then the other is also prevented from rotating by pins 304 and 305.

When clutch sub-assembly 410 is in the engaged state, spring 303 works to (i) separate clutch adapter 302 from timing pulley 306, thereby creating gap 414 between clutch adapter 302 and timing pulley 306 and (ii) keep clutch adapter 302 firmly pressed against spindle plate 401, thereby preventing clutch adapter 302 from rotating. Since, in the engaged state, clutch adapter 302 is prevented from rotating by its firm attachment to spindle plate 401, timing pulley 306 is also prevented from rotating in the engaged state. In turn, screw nut 307, which is rigidly attached to timing pulley 306, is also prevented from rotating in the engaged state.

As noted above, screw nut 307 is substantially a hollow cylinder having (i) an internal thread matching the thread of leadscrew 202, and (ii) threaded necks 315 and 317 above and below, respectively midsection 316, where the outside diameter of necks 315 and 317 is shorter than the outside diameter of midsection 316. Timing pulley 306 is screwed onto threaded bottom neck 315 of screw nut 307 for a rigid attachment. When screw nut 307 is prevented from rotating by the connection to guide rods 203 and 204 via clutch sub-assembly 410, the interactions of screw nut 307 with leadscrew 202 and nut adapter 308 translate the rotation of leadscrew 202 into linear motion of multi-motion assembly 206 along leadscrew 202.

Top neck 317 of screw nut 307 is screwed into lower part 318 of nut adapter 308 for a rigid attachment. Lower part 318 of nut adapter 308 has an inside thread to match the thread of top neck 317. Top part 319 of nut adapter 308 has an outside diameter smaller than the inside diameter of lower part 318 of nut adapter 308. A middle part of nut adapter 308 may have substantially the same inside diameter as top part 319 and substantially the same outside diameter as lower part 318 of nut adapter 308.

The outside diameter of top part 319 of nut adapter 308 is substantially equal to the inside diameter of ball-bearing assembly 309, allowing top part 319 of nut adapter 308 to be rigidly connected to the inner ring of ball-bearing assembly 309. Ball-bearing assembly 309 is substantially similar to ball-bearing assembly 301, and clutch adapter 310 is substantially similar to clutch adapter 302. Note that clutch adapter 310 may have recesses similar to recesses 313 and 312 of clutch adapter 302, but which are not used to house pins. Note, also, that elements described herein as substantially similar may be identical to each other or may have variations not considered material. The outside diameter of ball-bearing assembly 309 is substantially equal to the inside diameter of bottom part 413 of clutch adapter 310, thereby allowing for the rigid connection of the outer ring of ball-bearing assembly 309 to clutch adapter 310. The top of clutch adapter 310 is pressed firmly against top plate 402 thereby creating a rotation-preventing attachment due to the relatively high coefficient of friction between clutch adapter 310 and top plate 402.

When leadscrew 202 rotates with clutch sub-assembly 410 in the engaged state, multi-motion assembly 206 moves up or down, depending on the rotational direction of leadscrew 202. If leadscrew 202 rotates in direction 202a, then, because of the thread direction of leadscrew 202 and matching thread of screw nut 307, multi-motion assembly 206 moves up. Conversely, if leadscrew 202 rotates in direction 202b, then multi-motion assembly 206 moves down. Multi-motion assembly 206 is free to move down as far as brake plate 205, which is held in place relative to guide rods 203 and 204 by a holding mechanism (not shown). Note that, with clutch sub-assembly 410 in the engaged state, while multi-motion assembly 206 moves up or down in response to rotational motion of leadscrew 202, none of the components of multi-motion assembly 206 rotate in response to the rotational motion of leadscrew 202.

Figure 5:
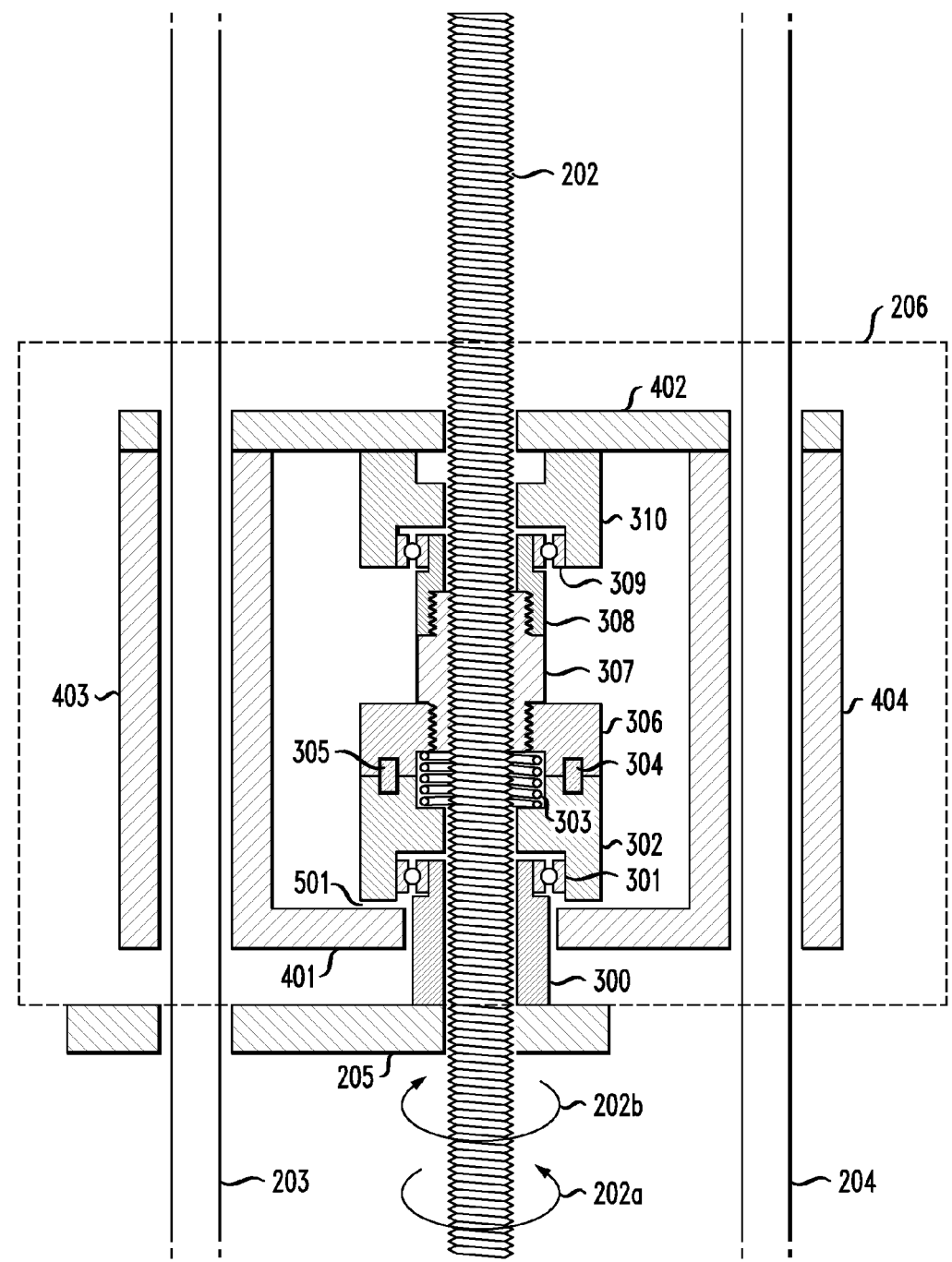
FIG. 5 shows a simplified partial cross-sectional of the multi-motion leadscrew system of FIG. 4 while in an unengaged state.

FIG. 5 shows a simplified partial cross-sectional view of multi-motion leadscrew system 201 while in the disengaged state. The elements in FIG. 5 are the same as in FIG. 4 and are similarly labeled. Note that, for greater simplicity, some elements of leadscrew system 201 that were labeled in FIG. 4 are not labeled in FIG. 5. FIG. 5 shows clutch sub-assembly 410 of multi-motion assembly 206 disengaged by brake plate 205. Clutch sub-assembly 410 gets disengaged when multi-motion assembly 206 is moved down just past the point at which clutch 300 makes contact with brake plate 205. As leadscrew 202 continues rotating in direction 202b after clutch 300 makes contact with brake plate 205, multi-motion assembly 206 is moved down slightly farther, and clutch 300 is forced up relative to the rest of multi-motion assembly 206. This, in turn, also forces up ball-bearing assembly 301 and clutch adapter 302. This movement also compresses spring 303 and partially or completely closes gap 414 between clutch adapter 302 and timing pulley 306. In addition, this movement also creates gap 501 between clutch adapter 302 and spindle plate 401, which means that clutch adapter 302 is no longer pressed firmly against spindle plate 401 and is now free to rotate relative to spindle plate 401. Note that clutch adapter 302 remains attached to ball-bearing assembly 301 and, via pins 304 and 305, to timing pulley 306.

Now that clutch sub-assembly 410 is in the disengaged state, further rotation of leadscrew 202 in direction 202b will cause screw nut 307 and elements attached to it (e.g., nut adapter 308, timing pulley 306, spring 303, and clutch adapter 302) to rotate with leadscrew 202 in direction 202b. Note that the inner ring of ball-bearing assembly 309 and outer ring of ball-bearing assembly 301 will also rotate in direction 202b with screw nut 307. Also note that pins 304 and 305 will orbit around leadscrew 202 in direction 202b.

As long as leadscrew 202 keeps rotating in direction 202b, (i) multi-motion assembly 206 will stay in place, held by brake plate 205 and (ii) screw nut 307 and its attached elements will keep rotating with leadscrew 202. If leadscrew 202 changes direction and rotates in direction 202a, then (i) the movements described above in relation to FIG. 5 will reverse, (ii) the components of multi-motion assembly 206 will return to the arrangement shown in FIG. 4, and (iii) multi-motion assembly 206 will move up and away from brake plate 205. Leadscrew system 201 will then operate as described in the section describing FIG. 4. It should be noted that clutch 300 does not rotate with leadscrew 202 in either the engaged or disengaged state.

It should be noted that, as in other clutch-related contexts, the term "engaged" is used to refer to the state of a clutch sub-assembly when its friction plate is pressed firmly against a corresponding surface. In typical clutch-related contexts, engaging the clutch sub-assembly means having the clutch sub-assembly rotate along with the corresponding surface, which is typically connected to an engine. However, unlike the typical clutch-related contexts, engaging clutch sub-assembly 410 of FIG. 4 actually prevents the clutch sub-assembly from rotating since the corresponding surface does not rotate and is not rigidly connected to a motor shaft.

An embodiment of the invention has been described where, when clutch sub-assembly 410 of multi-motion assembly 206 of FIG. 4 is in the engaged state, the components of multi-motion assembly 206 do not rotate when leadscrew 202 rotates. Alternative embodiments may add components to multi-motion assembly 206 where those additional components would rotate with leadscrew 202 when the clutch sub-assembly is in the engaged state, while the other components of multi-motion assembly 206 would not rotate.

An embodiment of the invention has been described where clutch 300 of FIGS. 4 and 5 does not rotate with leadscrew 202. In one alternative embodiment, ball-bearing assembly 301 is removed, and clutch 300 is rigidly attached to clutch adapter 302. Instead, either brake plate 205 or clutch 300 comprises a ball-bearing assembly so that, in the disengaged state, when brake plate 205 presses against clutch 300, the ball-bearing assembly allows clutch 300 to rotate together with clutch adapter 302 and leadscrew 202. In one alternative embodiment, clutch adapter 302 and clutch 300 are joined into a single element.

In one alternative embodiment, a spring is used to press clutch adapter 310 of FIG. 4 against top plate 402. Use of this spring may require appropriate modifications of components of multi-motion assembly 206.

An embodiment of the invention has been described where clutch adapter 302 of FIG. 4 is pressed against spindle plate 401. In one alternative embodiment, the contact area for clutch adapter 302 on spindle plate 401 is made of a material different from the material of the rest of spindle plate 401. For example, if spindle plate 401 is metallic, then the contact area may be some high-friction material to better grip clutch adapter 302 when in contact. Similarly, the contact area for clutch adapter 310 may also be of a different material from the rest of top plate 402. Note that the contacting surface of either contact area in any of the embodiments may be (i) at the same level as the rest of the plate, (ii) below the level of the rest of the plate, as in a counter-bore, or (iii) raised above the level of the rest of the plate. In one implementation, the area of spindle plate 401 that contacts clutch adapter 302 is machined to be a relatively smooth surface so that clutch adapter 302 wears down evenly. In one implementation, where spindle plate 401 is cast and, consequently, relatively rough, a smooth-surfaced counter-bore is formed by machining in the contact area of spindle plate 401. In another implementation, where spindle plate 401 is machined and, consequently, relatively smooth, no counter-bore is formed in the contact area of spindle plate 401.

An embodiment of the invention has been described where screw nut 307 is rigidly attached to nut adapter 308 and timing pulley 306 of FIG. 4. In one alternative embodiment, nut adapter 308 is eliminated, and screw nut 307 directly attaches to ball-bearing assembly 309, with appropriate modifications to screw nut 307 and/or ball-bearing assembly 309. In another alternative embodiment, screw nut 307 is integrated with one or both of nut adapter 308 and timing pulley 306 to form a single element.

An embodiment of the invention has been described where two pins, namely pins 304 and 305 of FIG. 4, interconnect clutch adapter 302 and timing pulley 306. In one alternative embodiment, three pins, equally spaced apart, are used instead. In other alternative embodiments, different numbers of pins are used to interconnect clutch adapter 302 and timing pulley 306.

An embodiment of the invention has been described where the pins interconnecting clutch adapter 302 and timing pulley 306 of FIG. 4, as well as the corresponding recesses in clutch adapter 302 and timing pulley 306, are cylindrical. In some alternative embodiments, the interconnecting pins and corresponding recesses are in the shape of a suitable prism, such as a right prism having any suitable cross-section. In general, the pins and corresponding recesses may be of any suitable shape to keep timing pulley 306 and clutch adapter 302 from rotating independently of each other while allowing clutch adapter 302 and timing pulley 306 to move closer together or farther apart. In some alternative embodiments, alternative mechanisms, which do not include pins, are used to keep timing pulley 306 and clutch adapter 302 from rotating independently of each other while allowing them to move closer together or farther apart.

Embodiments of the invention have been described where the pins interconnecting clutch adapter 302 and timing pulley 306 of FIG. 4 are free to move within the corresponding recesses of both clutch adapter 302 and timing pulley 306. In one alternative embodiment, one or more of the interconnecting pins are rigidly attached or form a part of clutch adapter 302. In another alternative embodiment, one or more of the interconnecting pins are rigidly attached to or form a part of timing pulley 306.

Brake plate 205 of FIGS. 2, 4, and 5 has been described as held in place by a holding mechanism (not shown). In one embodiment, brake plate 205 is secured to remain in a single location. In another embodiment, brake plate 205 may be secured by the holding mechanism in any one of two or more pre-selected locations (e.g., at different elevations relative to bottom stand 207 in FIG. 2), where a user can move brake plate 205 by hand from one pre-selected location to another. In another embodiment, brake plate 205 may be secured by the holding mechanism at any one of an essentially infinite number of positions, as selected by a user.

An embodiment of the invention has been described where the clutch sub-assembly is disengaged by contact with a brake plate that is not part of the multi-motion assembly. In one alternative embodiment, the brake plate is integrated into the multi-motion assembly and can be selectively (i) fixed in place by a brake-plate control mechanism (not shown) to allow the disengagement of the clutch sub-assembly and (ii) freed to allow engagement of the clutch sub-assembly and the movement of brake plate along with the multi-motion assembly. In another alternative embodiment, no brake plate is needed since the multi-motion assembly comprises an internal mechanism to selectively engage and disengage the clutch sub-assembly. Such an internal mechanism may include, for example, one or more controllable electromagnets.

An embodiment of the invention has been described where collars around two guide rods are used to prevent the rotation of a screw nut, thereby controlling the linear motion of the screw nut in response to the rotation of the corresponding leadscrew. The invention is not limited to such an embodiment. Other number of guide rods and other mechanisms are usable to achieve the same result with respect to the translation of rotational motion to linear motion. In addition, other mechanisms may be developed in the future to achieve the same result. Embodiments of the invention may use such alternative mechanisms without departing from the scope of the present invention.

An embodiment of the invention has been described using a particular collection and arrangement of multi-motion assembly components. Alternative embodiments may use one or more different components to achieve the same results.

An embodiment of the invention has been described with a particular spindle-bearing assembly powered via timing belt 216 of FIG. 2. It should be noted that alternative embodiments are also contemplated. In one alternative embodiment, power is transferred by the use of one or more intermediary gear wheels and/or shafts rather than a belt. In one alternative embodiment, spindle-bearing assembly 212 does not include bearing assembly 213 and, instead, timing belt 216, or its equivalent, goes directly around a portion of stirring shaft 214. In one alternative embodiment, bearing assembly 213 comprises only one gear wheel that (i) is powered by timing belt 216 and (ii) is rigidly connected to stirring shaft 214. In one alternative embodiment, bearing assembly 213 comprises a variable transmission mechanism allowing, for example, stirring shaft 214 to rotate at variable speeds while timing belt 216 moves at a constant speed. The particular transmission setting may be selected by any means now known in the art or later developed. In alternative embodiments, stirrer 215 is replaced by other attachments such as, for example, a sample basket for holding a submerged sample.

In one implementation of stirring system 200 of FIG. 2, timing pulley 306 has teeth on its exterior circumference and timing belt 216 has matching teeth on its inside. A corresponding component of bearing assembly 213 also has teeth on its exterior to match the teeth of timing belt 216. The variously corresponding teeth help increase mutual grip of the corresponding components and allow for more precise control of the rotation of stirrer 215.

Exemplary embodiments have been described wherein particular elements perform particular functions. However, the particular functions may be performed by any suitable element or collection of elements and are not restricted to being performed by the particular elements named in the exemplary embodiments.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy would be allowed to be transferred between two or more elements, and the interposition of one or more additional elements is contemplated, although not required. The terms "directly coupled," "directly connected," etc., imply that the connected elements are contiguous.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. Apparatus comprising a multi-motion assembly, the multi-motion assembly comprising:
    a screw nut having a spiral inside thread that matches a spiral outside thread of a leadscrew;
    a clutch sub-assembly directly connected to the screw nut, the clutch sub-assembly adapted to operate in an engaged state and in a disengaged state, wherein:
        in the engaged state, the clutch sub-assembly prevents the screw nut from rotating with the leadscrew, such that rotation of the leadscrew causes linear movement of the screw nut; and
        in the disengaged state, the clutch sub-assembly allows the screw nut to rotate with the leadscrew, such that rotation of the leadscrew causes corresponding rotation of the screw nut; and
    the apparatus further comprises at least one of:
        (1) a timing pulley located about the leadscrew and rigidly connected to the screw nut; and
        (2) a stirring shaft connected to the multi-motion assembly such that in the disengaged state, rotation of the leadscrew causes corresponding rotation of the stirring shaft.

2. The apparatus of claim 1, wherein the multi-motion assembly further comprises a spindle plate having a first opening for the leadscrew and a second opening for a first guide rod, wherein:
    the first guide rod is substantially parallel to the leadscrew;
    the spindle plate is adapted to travel along the leadscrew and first guide rod;
    in the engaged state, the clutch sub-assembly rigidly connects the screw nut to the spindle plate; and
    in the disengaged state, the clutch sub-assembly rotatably connects the screw nut to the spindle plate.

3. The apparatus of claim 2, wherein the second opening is a cylindrical collar for sliding along the first guide rod.

4. The apparatus of claim 2, wherein the apparatus further comprises:
    the leadscrew, wherein the leadscrew has a first end and an opposing second end;
    the first guide rod, wherein the first guide rod has a first end and an opposing second end;
    a motor connected to provide rotational power to the leadscrew;
    a bottom stand adapted to stabilize the first ends of the leadscrew and the first guide rod; and
    an apparatus top plate adapted to stabilize the second ends of the leadscrew and the first guide rod.

5. The apparatus of claim 2, wherein the clutch sub-assembly comprises:
    the timing pulley located about the leadscrew and rigidly connected to the screw nut; and
    a first clutch adapter located about the leadscrew and movably connected to the timing pulley, wherein:
        in the engaged state, the first clutch adapter is pressed against the spindle plate, such that the first clutch adapter and timing pulley do not rotate with the leadscrew; and
        in the disengaged state, the first clutch adapter does not touch the spindle plate, such that the first clutch adapter and timing pulley rotate with the leadscrew.

6. The apparatus of claim 5, wherein:
    the clutch sub-assembly further comprises one or more connecting pins;
    the timing pulley has one or more corresponding recesses for the one or more connecting pins;
    the first clutch adapter has one or more corresponding recesses for the one or more connecting pins; and
    the one or more connecting pins are located and sized to translate within the corresponding recesses of the timing pulley and the first clutch adapter.

7. The apparatus of claim 5, wherein:
    the apparatus further comprises a brake plate having an opening for the leadscrew;
    the clutch sub-assembly further comprises a clutch rotatably connected to the first clutch adapter;
    in the engaged state, the brake plate is not in contact with the clutch; and
    in the disengaged state, the clutch is pressed against the brake plate such that the first clutch adapter and timing pulley rotate with the leadscrew.

8. The apparatus of claim 7, wherein the brake plate can be positioned in any one of a plurality of different locations along the leadscrew.

9. The apparatus of claim 5, wherein the clutch sub-assembly further comprises a compression spring located between the timing pulley and the first clutch adapter for providing a force tending to separate the timing pulley from the first clutch adapter.

10. The apparatus of claim 5, wherein a contact area of the spindle plate for the first clutch adapter is machined smooth and counter-bored.

11. The apparatus of claim 2, wherein:
    the clutch sub-assembly further comprises:
        the timing pulley located about the leadscrew, rigidly connected to the screw nut, and having one or more recesses for one or more corresponding connecting pins;
        a first clutch adapter located about the leadscrew, movably connected to the timing pulley, and having one or more corresponding recesses for the one or more connecting pins, wherein:
            in the engaged state, the first clutch adapter is pressed against the spindle plate, such that the first clutch adapter and timing pulley do not rotate with the leadscrew; and
            in the disengaged state, the first clutch adapter does not touch the spindle plate, such that the first clutch adapter and timing pulley rotate with the leadscrew;
        a first ball-bearing assembly located about the leadscrew;
        a clutch located about the leadscrew and rotatably connected to the first clutch adapter via the first ball-bearing assembly;
        the one or more connecting pins located and sized to translate within the corresponding recesses of the first clutch adapter and the timing pulley; and
        a compression spring located between the timing pulley and the first clutch adapter for providing a force tending to separate the timing pulley from the first clutch adapter; and
    the multi-motion assembly further comprises:
        a nut adapter located about the leadscrew and rigidly connected to the screw nut;
        an assembly top plate rigidly connected to the spindle plate and having openings for the leadscrew and first guide rod;
        a second ball-bearing assembly located about the leadscrew; and a second clutch adapter (i) located about the leadscrew, (ii) rotatably connected to the nut adapter via the second ball-bearing assembly and (iii) pressed against the top plate.

12. The apparatus of claim 11, wherein:
the screw nut has a threaded upper neck and a threaded lower neck;
the timing pulley is a hollow cylinder having a threaded internal protrusion at the top;
the threading of the internal protrusion of the timing pulley matches the threading of the lower neck of the screw nut;
each of the first and second clutch adapters is a hollow cylinder having an annular internal protrusion in the middle;
the compression spring is located in a recess formed by the internal protrusions of the timing pulley and the clutch adapter;
the nut adapter has a lower part and an upper part;
the upper part of the nut adapter has a smaller outer diameter than the outer diameter of the lower part of the nut adapter;
the lower part of the nut adapter has inner threading matching the threading of the upper neck of the screw nut;
each of the first and second ball-bearing assemblies has a plurality of bearing balls rotatably connecting two concentric rings;
the clutch is a hollow cylinder having a bottom part and a top neck, the top neck having a smaller outside diameter than the bottom part; and
the outer diameter of the clutch is less than the diameter of the spindle plate's opening for the leadscrew.

13. The apparatus of claim 1, further comprising a brake plate having an opening for the leadscrew, wherein:
the brake plate is not rotatable by the leadscrew;
if the multi-motion assembly is not in contact with the brake plate, then the multi-motion assembly is in the engaged state and free to travel along the leadscrew in response to rotation of the leadscrew; and
if the multi-motion assembly is pressed against the brake plate, then the multi-motion assembly is in the disengaged state, and the screw nut rotates in conjunction with rotation of the leadscrew.

14. The apparatus of claim 1, wherein the multi-motion assembly further comprises an integrated mechanism adapted to selectively shift the clutch sub-assembly between the engaged and disengaged states.

15. The apparatus of claim 1, further comprising a spindle-bearing assembly rigidly connected to the multi-motion assembly, wherein the spindle-bearing assembly comprises the stirring shaft connected to the multi-motion assembly, such that:
in the engaged state, rotation of the leadscrew causes linear motion of the spindle-bearing assembly corresponding to the linear motion of the multi-motion assembly, whereby the stirring shaft does not rotate; and
in the disengaged state, rotation of the leadscrew causes corresponding rotation of the stirring shaft.

16. The apparatus of claim 15, wherein:
the multi-motion assembly comprises the timing pulley located about the leadscrew and rigidly connected to the screw nut; and
the spindle bearing assembly is connected to the timing pulley via a timing belt.

17. The apparatus of claim 1, wherein:
if rotating the leadscrew in a first direction switches the clutch sub-assembly from the engaged state to the disengaged state, then:
continuing to rotate the leadscrew in the first direction keeps the clutch sub-assembly in the disengaged state; and
reversing the rotation of the leadscrew to rotate in a second direction switches the clutch sub-assembly from the disengaged state to the engaged state.

18. A method for operating the apparatus of claim 1, the method comprising:
in the engaged state, using the clutch sub-assembly to prevent the screw nut from rotating with the leadscrew, such that rotation of the leadscrew causes linear movement of the screw nut; and
in the disengaged state, using the clutch sub-assembly to allow the screw nut to rotate with the leadscrew, such that rotation of the leadscrew causes corresponding rotation of the screw nut.

19. The apparatus of claim 1, wherein:
the apparatus comprises the stirring shaft; and
in the engaged state, rotation of the leadscrew causes linear motion of the stirring shaft without rotating the stirring shaft.

20. The apparatus of claim 1, wherein the clutch sub-assembly is connected to the screw nut such that the clutch sub-assembly moves linearly together with the screw nut.

21. The apparatus of claim 1, wherein:
the apparatus comprises the stirring shaft; and
the stirring shaft is not in direct contact with the clutch sub-assembly.

22. A method for operating an apparatus comprising a multi-motion assembly and a stirring shaft connected to a stirrer and to the multi-motion assembly, the multi-motion assembly comprising (i) a screw nut having an inside thread that matches an outside thread of a leadscrew and (ii) a clutch sub-assembly directly connected to the screw nut for operating in an engaged state and in a disengaged state, the method comprising:
in the engaged state, using the clutch sub-assembly to prevent the screw nut from rotating with the leadscrew, such that rotation of the leadscrew causes linear movement of the screw nut; and
in the disengaged state, using the clutch sub-assembly to allow the screw nut to rotate with the leadscrew, such that rotation of the leadscrew causes corresponding rotation of the screw nut and corresponding rotation of the stirrer.

* * * * *